(12) United States Patent
Heckt et al.

(10) Patent No.: US 6,981,519 B2
(45) Date of Patent: Jan. 3, 2006

(54) PRESSURE-REGULATING VALVE

(75) Inventors: Roman Heckt, Aachen (DE); Thomas Klotten, Cologne (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 230 days.

(21) Appl. No.: 10/308,685

(22) Filed: Dec. 3, 2002

(65) Prior Publication Data

US 2003/0131894 A1 Jul. 17, 2003

(30) Foreign Application Priority Data

Dec. 4, 2001 (DE) ......................... 101 59 362

(51) Int. Cl.
*F16K 17/04* (2006.01)

(52) U.S. Cl. ............. 137/599.18; 123/323; 137/599.17; 137/601.2; 251/305

(58) Field of Classification Search ............ 137/599.18, 137/601.17, 601.2; 123/323; 251/305
See application file for complete search history.

(56) References Cited

U.S. PATENT DOCUMENTS

| | | | | |
|---|---|---|---|---|
| 2,140,734 A | * | 12/1938 | Chandler | ............... 137/599.18 |
| 2,609,187 A | * | 9/1952 | Scott | .......................... 261/23.2 |
| 2,835,268 A | * | 5/1958 | Dillberg et al. | ......... 137/315.22 |
| 3,523,418 A | * | 8/1970 | Marsee | ........................ 60/292 |
| 4,605,201 A | * | 8/1986 | Miyazaki | .................... 251/305 |
| 4,770,392 A | | 9/1988 | Schmidt | |
| 5,372,109 A | * | 12/1994 | Thompson et al. | ......... 123/323 |
| 5,979,871 A | * | 11/1999 | Forbes et al. | ............... 251/305 |
| 6,003,554 A | | 12/1999 | Magdelyns et al. | |

FOREIGN PATENT DOCUMENTS

| | | |
|---|---|---|
| GB | 1 452 326 | 10/1976 |
| GB | 2 090 946 | 7/1982 |
| GB | 2 344 086 | 5/2000 |
| GB | 2 370 298 | 6/2002 |
| JP | 8219298 | 8/1996 |
| JP | 9013996 | 1/1997 |

* cited by examiner

*Primary Examiner*—Stephen M. Hepperle
(74) *Attorney, Agent, or Firm*—Brinks Hofer Gilson & Lione

(57) ABSTRACT

Pressure-regulating valve having a throttle mounted in a tube section such that it can be pivoted about a pivot axis from an open position into a closed position. The throttle having a pressure relief valve mounted therein.

26 Claims, 1 Drawing Sheet

PRESSURE-REGULATING VALVE

BACKGROUND OF THE INVENTION

1. Field of the Invention

The invention relates to a pressure-regulating valve. More particularly, the present invention relates to pressure regulating valves used in the exhaust systems of vehicles having combustion engines.

2. Description of Known Art

In exhaust systems, for example, throttle valves are known to be used as engine brakes for trucks. When used in this manner, a throttle is arranged in an exhaust-tube section such that it can be pivoted about an axis in a direction perpendicular to the longitudinal axis of the exhaust-tube section. The throttle can assume an open position, in which the throttle plane is aligned parallel to the exhaust-gas flow, and thus displays only a low level of flow resistance to the exhausts. In a closed state, the throttle is arranged such that it closes the cross section of the exhaust-tube section. It thus forms upstream, in the exhaust-gas flow, a dynamic pressure which propagates into the combustion chambers of the internal combustion engine. This pressure has a braking action there, because, with the throttle valve of the exhaust system closed, the exhaust stroke of the internal combustion engine requires a higher outlay in terms of energy.

In the case of such an engine brake, the task is essentially to build up counterpressure in a closed position and, in an open position, to allow exhaust gas to flow past as much as possible without obstruction. It is not appropriate for an engine brake to regulate pressure in the exhaust duct.

It is also known, for example for the use of exhaust-gas heat exchangers, to provide counterpressure regulating valves which are arranged in the exhaust-gas flow, through which flow takes place in the event of heating. As a result of the increased exhaust-gas pressure, the performance of the internal combustion engine is inevitably increased, and the exhaust-gas temperature is thus raised. The elevated exhaust-gas temperature produced by means of such counterpressure valves ensures an improvement in the heating capacity of exhaust-gas heat exchangers.

Furthermore, in addition to performing the pressure-regulating function, counterpressure regulating valves have to ensure that, in their open position, the larges possible throughflow cross section is available for the exhaust gas.

A valve of throttle-type construction has a large throughflow cross section in the open position because, in the open position, the flat throttle displays only a very low level of flow resistance.

WO01/50047 discloses a bypass valve which is fitted in the exhaust line and has a throttle element mounted in an eccentrically pivotable manner in an exhaust-tube section. The throttle element can be moved from an open position into a closed position via a lever and an actuating mechanism. In terms of functioning, this valve is comparable with an engine-brake valve. Defined pressure regulation does not take place by this means.

Also known is a throttle-construction pressure-regulating valve for exhaust systems in the case of which the throttle element is arranged such that it can be pivoted eccentrically about an axis and is subjected to a constant closing force and/or to a constant closing torque via an actuating mechanism.

Counterpressure regulating valves in exhaust systems have basically three operating states. A first operating state is a closed operating state, that is to say the throttle element seals the through-passage cross section completely, with the result that no exhaust gas can pass.

The second operating state is the fully opened operating state, in the case of which the throttle element has its throttle-element plane aligned in the direction of the exhaust-gas flow, with the result that the throughflow cross section is more or less fully open, that is to say is released for the through-passage of exhaust gas.

A third operating state is the so-called pressure-regulating operating state, which is described in more detail hereinbelow. In the case of this operating state, the throttle is opened partially and releases a comparatively small cross section. It is usually the case that, during pressure-regulating operation, the throttle is arranged in a state in which it has been pivoted through 0° to 5° out of the closed position.

The eccentricity of the throttle element is such that the exhaust-gas flow acts on the throttle wings of different sized adjacent to the eccentric pivot axis so as to produce an opening torque for the throttle. The opening torque on account of the exhaust-gas pressure is set counter to the closing torque on account of the constant actuating force of the actuating device. In a state of equilibrium, in the case of which the opening torque and the closing torque are of equal magnitude, the throttle element is arranged in a partially opened position, with re result that, in dependence on the closing torque applied, a constant positive pressure builds up upstream of the throttle element, as seen in the flow direction.

Such a pressure-regulating valve ensures a constant dynamic pressure merely for static flow conditions, that is to say for a constant exhaust-gas-volume flow. However, in the case of dynamic flow conditions, that is to say with the exhaust-gas-volume flow changing constantly, for example during the load cycle of an internal combustion engine, an undesirable fluctuation in pressure regulation (hysteresis) has been observed.

This is attributable to different flow and pressure conditions of the compressible exhaust gas in the gap region of the partially opened throttle. As a result, in the case of increasing exhaust-gas flow, a dynamic pressure is established upstream of the throttle that differs from the case of a dynamically decreasing exhaust-gas flow. Such occurs during each load cycle of an internal combustion engine.

SUMMARY

It is an object of this invention to provide a pressure-regulating valve of throttle-type construction which, in particular in the case of dynamic throughflow, has a high level of pressure-regulating accuracy and operates in a hysteresis-free manner. It is also intended for the pressure-regulating valve to display only a low level of flow resistance in an opened state.

These objects are achieved by a pressure-regulating valve in an exhaust system in a combustion engine.

DETAILED DESCRIPTION

Figure 1:
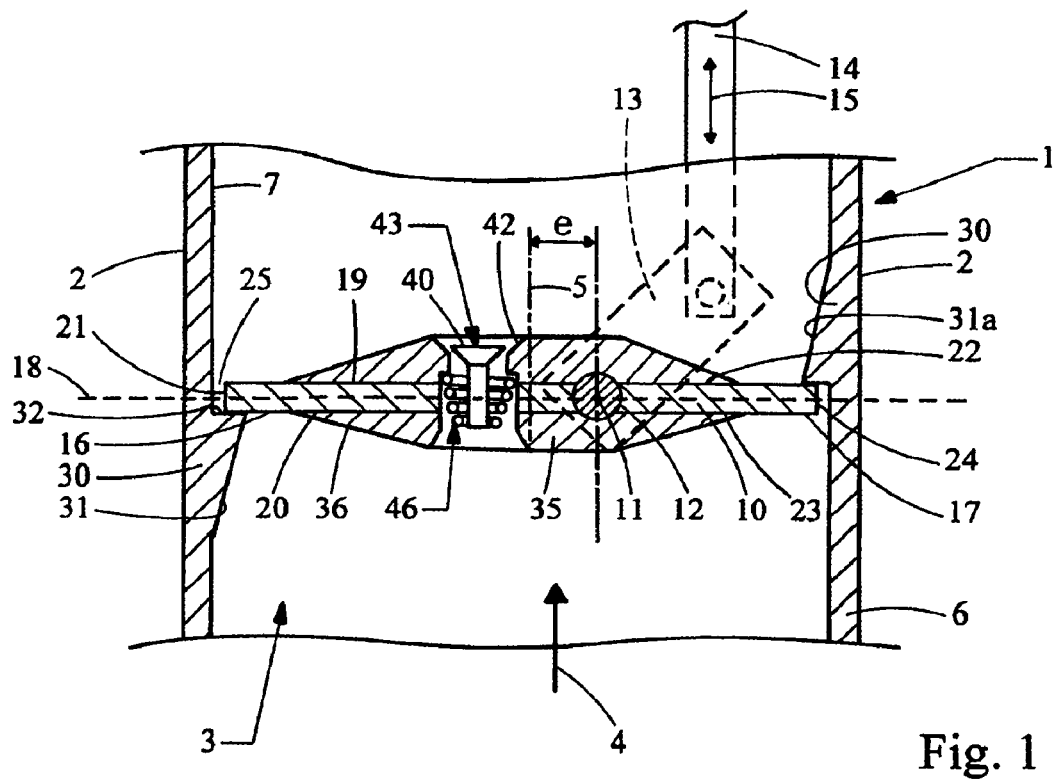
FIG. 1 shows a section through one preferred embodiment, according to the present invention, of a pressure-regulating valve of throttle-type construction in the closed position.
Figure 2:
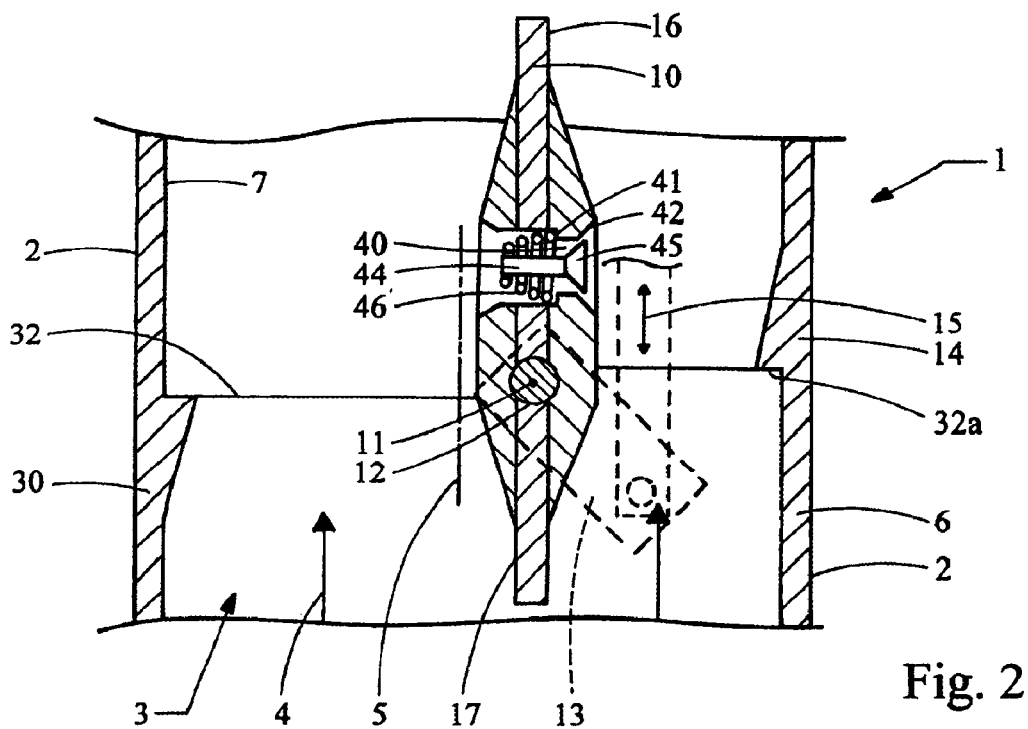
FIG. 2 shows the valve according to FIG. 1 in the open position.

A pressure-regulating valve 1 according to the invention (FIGS. 1 and 2) has, for example as the housing, a tube section 2 with a throughflow cross section 3 through which exhaust gas can flow in an exhaust-gas flow direction 4. The throughflow cross section 3 of the tube section 2 is, for example, of circular cross section and has a center axis 5. The tube section 2 is designed as a thin-walled tube with a tube wall 6 which has an inner side 7 which delimits the throughflow cross section 3.

Arranged in the interior of the tube section 2 is a throttle 10 which is arranged such that it can be pivoted about an axis 11 directed perpendicular to the center axis 5. The pivot axis 11 may be spaced apart, by a distance e, from the center axis 5, with the result that the pivot axis 11 is arranged eccentrically in relation to the center axis 5. The amount e is preferably in the range between $0<e<\frac{1}{8}$ D–$\frac{1}{12}$ D, in particular about $\frac{1}{10}$ D, where D is the diameter of the throttle.

According to another preferred embodiment, the pivot axis 11 is arranged centrally, that is to say the pivot axis 1 intersects the center axis 5. The eccentricity e thus has the value of 0. The exhaust-gas flow consequently does not subject the throttle 10 to an opening torque, with the result that the position of the throttle 10 in the tube section 2 is not influenced by the exhaust gas.

The throttle 10 has a throttle stem 12 which is mounted such that it can be rotated about the pivot axis 11. At least one end of the throttle stem 12 penetrates the wall 6 of the tube section 2 and projects some way outside the tube section 2. At the free end (not shown) of the throttle stem 12, said free end being located outside the tube section 2, a lever element 13 is connected in a rotationally fixed manner to the throttle stem 12. At the free end of the lever element 13, the lever element 13 is connected to a push rod 14, which can be driven such that it can be moved in a double-arrow direction 15, for example parallel to the center axis 5. for this purpose, use is usually made of an actuating device (not shown) e.g. a negative-pressure/positive-pressure drive device or some other linear-drive device.

Located in a throttle plane 18, a first throttle wing 16 and a second throttle wing 17 extend from the throttle stem 12. The throttle wings 16, 17 are designed essentially in the form of flat plates and extend away from the throttle stem 12 in the throttle plane 18 more or less as far as the inner side 7 of the tube. The first throttle wing 16 has a first flat side 19 and a second flat side 20 as well as a boundary edge 21. The second throttle wing 17 has a first flat side 22, a second flat side 23 as well as a boundary edge 24. In a closed position of the throttle stem 12 (FIG. 1), in which the throttle plane 18 is located perpendicularly to the center axis 5, the boundary edges 21, 24 together with the inner side 7 of the tube section 2 form a clearance gap 25.

Adjacent to the cross-section plane of the tube section 2 which runs through the pivot axis 11, the wall 6 has thickened portions 30 which are bounded by a ramp surface 31, 31a and step surfaces 32, 32a. The step surface 32, in the region of the first throttle wing 16, is oriented in the same direction as the exhaust-gas flow direction 4, in the axial direction of the tube section 2. The step 32a is oriented counter to the exhaust-gas flow direction 4, in the axial direction of the tube section 2. The radial extent to the steps 32, 32a is somewhat greater than the clearance gap 25, with the result that, in the closed state of the throttle, the first throttle wing 16 has the border of its second flat side 20 resting on the step 32 and the second throttle wing 17 has the border region of its first flat side 22 resting on the step 32a. In this position, the through-passage cross section 3 is closed off in a sealed manner by the throttle 10.

In a plan view, the throttle 10 has increased material thickness in the center, with the result that a cylindrical thickened portion 35 is formed. The thickened portion 35 is arranged on both sides in relation to the throttle wings 16, 17 and extends, from the radial center of the throttle 10, approximately over a third of the diameter of the throttle 10. On the outside in the radial direction, the thickened portion 35 is adjoined by a tapered portion 36 which reduces the material thickness of the throttle 10, in a wedge-shaped manner in cross section, in the direction of the border region of the throttle wings 16, 17.

In the region of the thickened portion 35, the throttle 10 has a cylindrical through-passage opening 40 perpendicular to the throttle plane 18. The through-passage opening 40 has a step 41 and is designed, in a radially widened manner at one end, as a stepped bore. The through-passage opening 40 is of conically widened design at both ends, the conically widened portion at one end being designed as a sealing seat 42. A valve element 43 with a valve tappet 44 and a valve cone 45 is arranged in an axially displaceable manner in the opening 40. The valve cone 45 is fitted in the sealing seat 42. The valve tappet 44 is of radially widened design at its free end, a conical helical spring 46 being supported between the step 41 and the radially widened end of the valve tappet 44.

The helical spring 46 is of conical design, having a larger diameter in the region of the step 41 and a smaller diameter in the region of the radically widened end of the valve tappet 44.

The through-passage opening 40, the helical spring 46 and the valve element with the valve tappet 44 and the sealing cone 45 thus form a valve, which is integrated in the throttle 10, in the manner of a pressure relief valve, in particular of a pressure relief tappet valve. The spring constant of the helical spring 46 here is selected such that, with the throttle 10 closed according to FIG. 1, the pressure relief valve, in the case of a predetermined pressure difference between the regions upstream and downstream of the throttle 10 (as seen in the flow direction 4), opens.

The functioning of the pressure-regulating valve according the invention is explained in more detail hereinbelow. In an opened position (according to FIG. 2), the throttle 10 is arranged such that the throttle plane 18 is aligned approximately parallel to the throughflow direction 4, with the result that the throttle 10 releases the throughflow cross section to the maximum extent and exhaust gas can flow in the throughflow direction 4.

In this position, the valve 40, 44, 45, 46 in the manner of a pressure relief valve is not active since there is no pressure difference present in the direction in which the valve acts.

In a closed position (FIG. 1) of the pressure-regulating valve 1 according to the invention, the throttle 10 is subjected, via the push rod 14 and the lever 13, to a closing force such that the throttle 10 has its border regions resting with sealing action on the steps 32 and 32a of the tube walls 6. The throttle 10 thus closes the cross section 3 fully. A positive pressure thus builds up upstream of the throttle 10, as seen in the exhaust-gas flow direction 4, and, once the pressure difference between the regions upstream of the throttle 10 and downstream of the throttle 10 which is predetermined for triggering the pressure release valve 40, 44, 45, 46 has been exceeded, causes the valve 40, 44, 46 to open, a defined pressure difference thus being established upstream and downstream of the throttle 10. According to the invention, it has been found that reliable and precise pressure regulation takes place if the pressure regulation and/or the volume-flow regulation is affected not with the throttle 10 in a partially opened position, but with the throttle 10 fully closed and with the throttle 10 provided with a valve

40, 44, 45, 46, in the manner of a pressure relief valve, which, once a defined pressure difference has been exceeded, opens and thus ensures a constant pressure difference on both sides of the throttle 10.

It is particularly advantageous for the eccentricity e to be selected to be very small, in particular equal to 0, because, with an eccentricity of 0, the gas flow does not subject the throttle 10 to any opening torque, which would have to be compensated for by corresponding closing forces. This avoids the situation where, in the case of very high exhaust-gas pressures, the throttle 10 lifts off from the steps 32, 32*a* and this adversely affects the pressure-regulating function of the valve 40, 44, 45, 46.

A pressure-regulating valve 1 according to the invention has the advantage that it is of relatively straightforward construction and, by virtue of the opening/closing and pressure-regulating functions being separated, makes it possible to establish a defined predetermined pressure difference upstream and downstream of the throttle 10, as seen in the flow direction 4. It is also advantageous that the pressure difference being established is independent of any dynamic change in exhaust-gas-volume flow occurring, with the result that, in the case of dynamic operation of an internal combustion engine, as constantly occurs in a motor vehicle, this does not influence a predetermined pressure difference to any significant extent.

In contrast to convention counterpressure regulating valves with a throttle in the case of which the pressure regulation takes place by means of a small opening gap via the throttle, the pressure-regulating valve according to the invention does not have any dynamic-pressure hysteresis in the case of changes in the dynamic exhaust-gas-volume flow. This results in very precise and foreseeable pressure regulation.

It should be apparent to those skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A pressure-regulating valve comprising:
   a tube section having an inner side defining at least a portion of a passageway;
   a throttle defining a throttle plane, said throttle pivotably mounted in the tube section, the throttle being pivotable about a pivot axis between an open position and a closed position;
   an actuator coupled to the throttle to pivot the throttle between the open and closed positions;
   a through-passage extending through the throttle perpendicular to the throttle plane, wherein the through-passage widens at a first end and at a second end; and
   a valve located within the through-passage opening and operable as a pressure relief valve when the throttle is in the closed position.

2. The pressure-regulating valve as claimed in claim 1, wherein the pivot axis is arranged centrally in the tube section and the pivot axis intersects a central longitudinal axis of the tube section.

3. The pressure-regulating valve as claimed in claim 1, wherein the pivot axis is arranged eccentrically, by an amount e, in the tube section.

4. The pressure-regulating valve as claimed in claim 3, wherein the tube section has a diameter D and e is not greater than $\frac{1}{8}$ D.

5. The pressure-regulating valve as claimed in claim 3, wherein the tube section has a diameter D and e is not greater than $\frac{1}{10}$ D.

6. The pressure-regulating valve as claimed in claim 3, wherein the tube section has a diameter D and e is not greater than $\frac{1}{12}$ D.

7. The pressure-regulating valve as claimed in claim 1, wherein the pressure relief valve is a tappet valve device.

8. The pressure-regulating valve as claimed in claim 1, wherein the pressure relief valve has an opening direction which, with the throttle closed, is in the same direction as an exhaust-gas flow direction and has a closing direction which, with the throttle closed, is directed counter to the exhaust-gas flow direction.

9. The pressure-regulating valve as claimed in claim 1, wherein the actuator is adapted to be located outside the tube section.

10. The pressure-regulating valve as claimed in claim 1, wherein the throttle has a stem coincident with the pivot axis, and the throttle stem penetrates a wall on the tube section such that an end of the stem extends through the tube section.

11. The pressure-regulating valve as claimed in claim 10, wherein a lever is connected in a rotationally fixed manner to the throttle stem at a position outside the tube section, and a push rod connected to the lever so as to open and close the throttle.

12. The pressure-regulating valve as claimed in claim 1, wherein a first throttle wing and a second throttle wing extend away from the pivot axis, the first and second throttle wings being designed essentially in the form of flat plates and extending in the throttle plane more or less as far as an inner side of the tube section.

13. The pressure-regulating valve as claimed in claim 12, wherein the first throttle wing has a first flat side and a second flat side as well as a boundary edge, the second throttle wing has a first flat side, a second flat side as well as a boundary edge, and, in the closed position of the throttle, in which the throttle plane is located perpendicularly to the central axis of the tube section edges together with the inner side of the tube section form a clearance gap.

14. The pressure-regulating valve as claimed in claim 13, wherein the tube section, adjacent to a cross-section plane running through the pivot axis, has thickened portions bounded by a ramp surface and by a step surface, the step surface in the region of the first throttle wing being oriented in the same direction as an exhaust-gas flow direction, and the step surface in the region of the second throttle wing being oriented counter to the exhaust-gas flow direction resulting in the formation of axial stop surfaces limiting the rotation of the throttle.

15. The pressure-regulating valve as claimed in claim 14, wherein a radial extent of the steps is greater than the clearance gap.

16. The pressure-regulating valve as claimed in claim 1, wherein in a plan view, the throttle has increased material thickness in a center thereof forming a thickened portion, arranged on both sides of the pivot axis and extending from a center of the throttle approximately over a third of the diameter of the throttle.

17. The pressure-regulating valve as claimed in claim 16, wherein outboard of the thickened portion is a tapered portion, which reduces the material thickness of the throttle, in a wedge-shaped manner in cross section, in the radial direction.

18. The pressure-regulating valve as claimed in claim 1, wherein the through-passage includes a step.

19. The pressure-regulating valve as claimed in claim 1, wherein the through-passage conically widens at the first and second ends, the first end being a sealing seat.

20. The pressure-regulating valve as claimed in claim 19, wherein arranged in an axially displaceable manner in the through-passage is a valve element interacting with the sealing seat.

21. The pressure-regulating valve as claimed in claim 20, wherein the valve element includes a valve cone and a valve tappet.

22. The pressure-regulating valve as claimed in claim 21, wherein the valve tappet includes a radially widened free end, a helical spring being supported between the step and the widened free end of the valve tappet.

23. The pressure-regulating valve as claimed in claim 22, wherein the helical spring is a conical helical spring having a larger diameter in the region of the step and a smaller diameter in the region of the radially widened end of the valve tappet.

24. The pressure-regulating valve as claimed in claim 23, wherein the helical spring has a spring constant and is selected such that, with the throttle closed, the pressure relief valve opens at a predetermined pressure difference between the regions upstream and downstream of the throttle.

25. A pressure-regulating valve comprising:

a tube section having an inner side defining at least a portion of a passageway;

a throttle defining a throttle plane, said throttle pivotably mounted in the tube section, the throttle being pivotable about a pivot axis between an open position and a closed position:

an actuator coupled to the throttle to pivot the throttle between the open and closed positions;

a through-passage extending through the throttle perpendicular to the throttle plane, wherein the through-passage conically widens at a first end and at a second end; and a valve located within the through-passage opening and operable as a pressure relief valve when the throttle is in the closed position.

26. The pressure-regulating valve as claimed in claim 25, wherein the first end of the through-passage is a sealing seat configured to engage a portion of the pressure relief valve.

* * * * *